Nov. 8, 1966  S. P. BRASWELL  3,283,405
INSIDE PIPE CUTTING TOOL
Filed Feb. 5, 1964  2 Sheets-Sheet 2
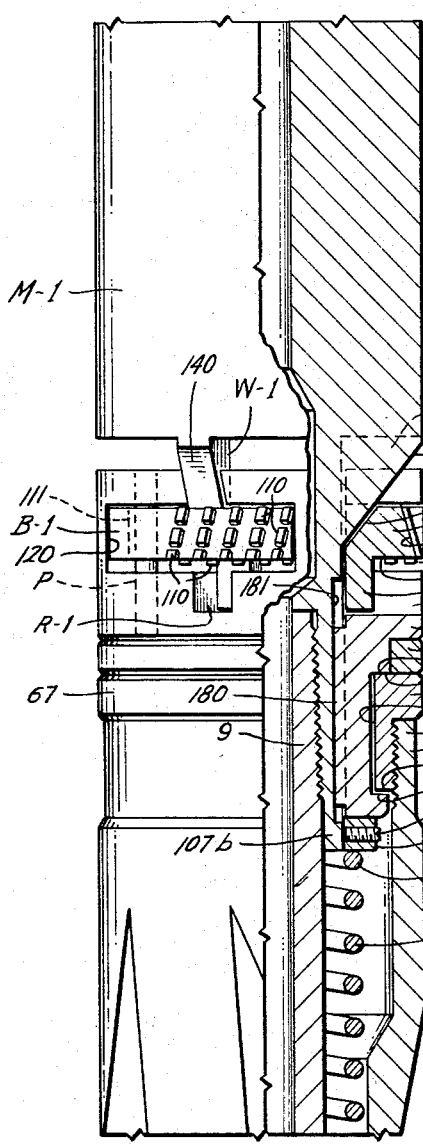
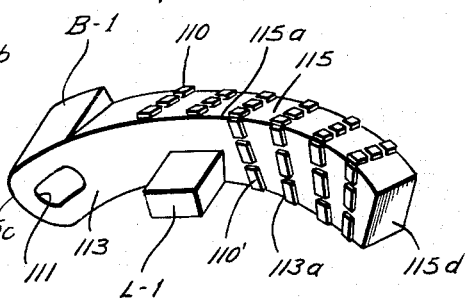
Samuel P. Braswell
INVENTOR.
BY Hayden & Pravel
ATTORNEYS

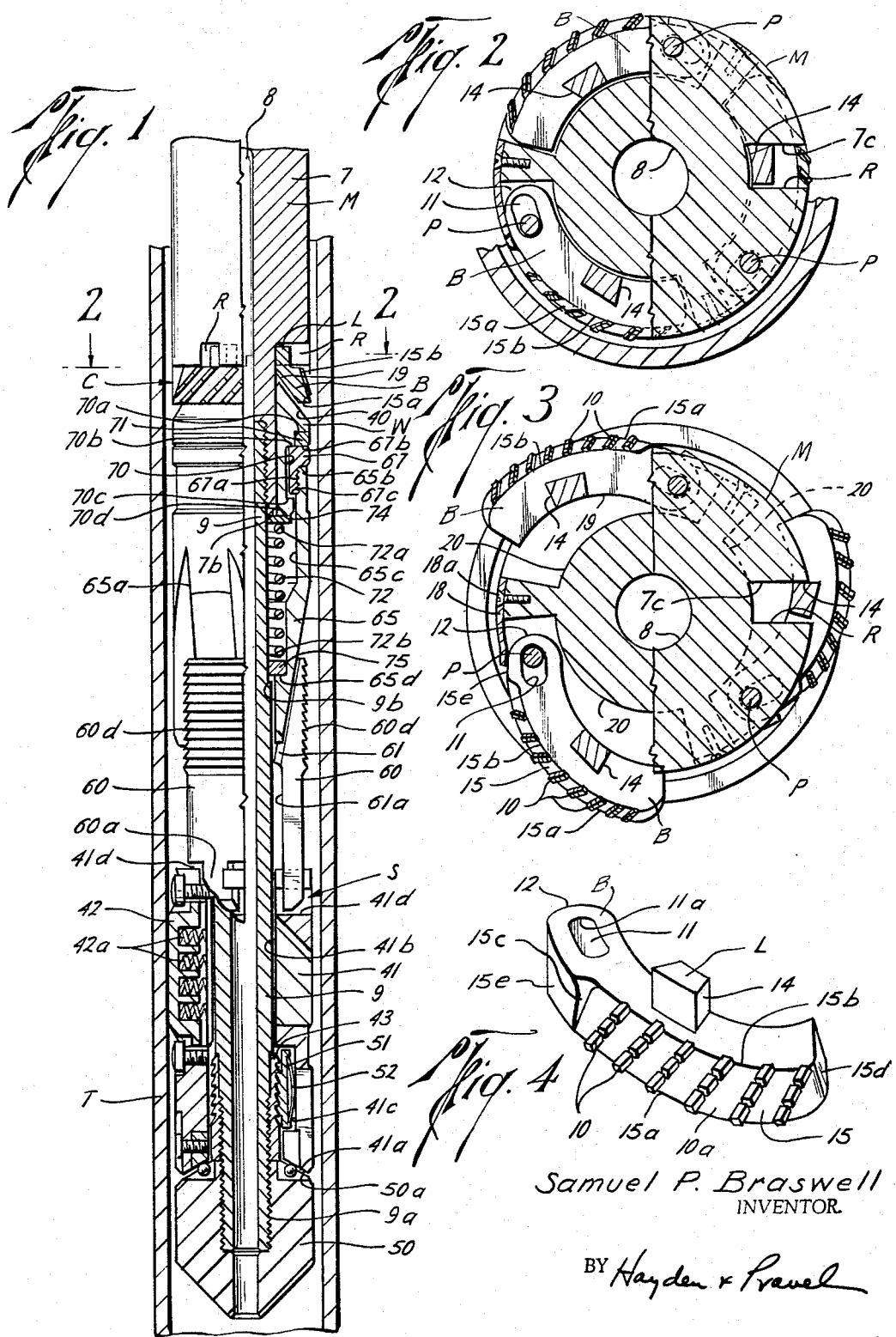

United States Patent Office 3,283,405
Patented Nov. 8, 1966

3,283,405
INSIDE PIPE CUTTING TOOL
Samuel P. Braswell, P.O. Box 146, Harvey, La.
Filed Feb. 5, 1964, Ser. No. 342,614
3 Claims. (Cl. 30—103)

The present invention relates to new and useful improvements in pipe cutters and more particularly to a new and improved inside pipe cutter adapted to be used in cutting pipe situated in a well bore.

The various pipe cutters presently used for cutting casing or tubing in a well bore have single tooth cutting blades which are mounted for substantially vertical pivotal movement relative to the pipe and which cut with a milling or chipping action. Such cutters are subjected to excessive torque as they are pivoted increasingly farther from their supports and thus are susceptible to being broken easily or sheared from their supports during the cutting operation.

Briefly, the present invention comprises a rotatable mandrel adapted to be rotated inside of a pipe and having arcuate cutter members pivotally mounted thereon for engaging and cutting the pipe upon rotation of the mandrel. Such cutters, which are adapted to be pivoted in a plane substantially horizontal to the axis of the pipe, have diagonally extending rows of cutter elements on the outer surface for cutting the pipe as well as internally disposed lugs thereon for engaging the mandrel to transmit part of the cutting load from the cutting members to the mandrel to thereby strengthen the tool.

An object of the preesnt invention is to provide a new and improved pipe cutter and new and improved cutter members for cutting pipe situated in a well bore wherein each cutting member or blade has multiple cutting edges.

Another object of the present invention is to provide a new and improved inside pipe cutter adapted to be inserted in a well pipe having cutting members with diagonal rows of cutting elements spaced and aligned so as to remove cuttings from the path of the cutting elements during the cutting operation.

And yet another object of the present invention is to provide a new and improved inside pipe cutter adapted to be inserted in a well pipe wherein each cutting member has rows of cutter elements arranged in spaced rows to urge the particles cut by such cutter elements to flow between such rows so as not to impede the cutting.

And still a further object of the present invention is to provide new and improved pipe cutter members adapted to be used on an inside pipe cutter wherein such cutter members have an arcuate inclined surface on which cutting elements are carried and the depth of the cut is controlled by the amount such cutting elements project from the surface of the cutter members.

Still another object of the present invention is to provide a new and improved inside pipe cutter adapted to be inserted in a well pipe wherein cutting members have spaced self cleaning cutter elements thereon so that particles cut by such cutter elements are driven away from the cutter elements through the longitudinal spaces therebetween.

Another object of the present invention is to provide a new and improved pipe cutter adapted to be inserted in a pipe situated in a well wherein the pipe cutter has cutter members with rows of spaced cutter elements of tungsten carbide or the like.

And yet another object of the present invention is to provide a new and improved inside pipe cutter for cutting pipe situated in a well bore wherein the pipe cutter has cutter blades pivotally mounted on a rotatable mandrel and such blades have torque load bearing members to eliminate the torque load of cutting from the pivotal mountings.

Still a further object of the present invention is to provide a new and improved inside pipe cutter adapted to be inserted in a well pipe wherein cutting members having arcuate cutting surfaces are mounted for substantially horizontal pivotal movement into engagement with the inner surface of the well pipe to cut such pipe upon rotation of the cutter.

A further object of the present invention is to provide a new and improved cutter blade for use on an inside pipe cutter wherein such cutter blade has an inclined arcuate surface on which cutter elements are secured.

Another object of the present invention is to provide a new and improved pipe cutter for cutting pipe situated in a well bore wherein the cutter members are supported substantially throughout their entire length from leading to trailing edge during the cutting operation.

And yet another object of the present invention is to provide a new and improved inside pipe cutter adapted to be inserted in a well pipe wherein cutter members are pivotally mounted on a rotatable mandrel and wherein cylindrical wedge means are provided on said mandrel for urging said cutter members to pivot radially outwardly.

The preferred embodiment of this invention will be described hereinafter, together with other feautres thereof, and additional objects will become evident from such description.

The invention will be more readily understood from a reading of the following specification and by reference to the accompanying drawings forming a part thereof, wherein an example of the invention is shown, and wherein:

FIG. 1 is a sectional view partly in elevation illustrating details of the cutter apparatus of the present invention and the slip mechanism for positioning the cutter apparatus in a well pipe;

FIG. 2 is a sectional view taken on line 2—2 of FIG. 1 showing the cutter blades of the present invention in the retracted position prior to cutting the pipe;

FIG. 3 is a sectional view corresponding to FIG. 2 but showing the cutter blades in the laterally expanded position after they have cut through the pipe;

FIG. 4 is an isometric view of one embodiment of the cutter blades of the present invention;

FIG. 5 is a view partly in elevation and partly in section illustrating an alternate arrangement of the apparatus of the present invention;

FIG. 6 is an isometric view looking up at a type of cutter blade for use in the alternate version of the present invention shown in FIG. 5; and FIG. 7 is an isometric view looking up at another modified cutter blade for use in the apparatus shown in FIG. 5.

In FIG. 1 of the drawings the letter C designates generally the cutter apparatus of the present invention which is adapted to be inserted into a well pipe T, such as casing or tubing or the like situated in a well bore. The cutter C is carried on standard inside cutter slips designated generally S, which are used to position the cutter C at the desired elevation in the pipe or tubing T. The cutter C includes a plurality of arcuate cutter blades B pivotally mounted on a rotatable mandrel M with a wedge cone or expander W for pivoting each cutter blade B laterally or radially into engagement with the inner periphery of the casing or tubing for cutting such casing when the mandrel M is rotated.

The cutter blades B have diagonal rows of cutter elements 10 aligned and spaced thereon to remove the cuttings from the path of the advancing cutter elements 10 so as not to impede or interfere with their cutting. With this invention the pipe or casing T may be cut more quickly and efficiently with a minimum risk of breaking or damaging the cutter members or blades B.

Considering the invention now in more detail, the blades

B are pivotally mounted in the hollow mandrel M whose upper portion 7 as viewed in FIG. 1, is normally adapted to be connected to a string of tubing or the like thereabove (not shown) for lowering and positioning the cutter C in the well pipe T and which has a lower tubular body 9 which extends longitudinally downwardly for supporting the slip mechanism S below the cutter C, as will be explained more fully hereinafter.

In the preferred form of the present invention, three arcuate cutter blades B are arranged at circumferentially spaced intervals on the hollow mandrel M which has a passage 8 extending longitudinally therethrough. However, one or more of such blades may be employed without departing from the scope of this invention. A longitudinal slot or eye 11 is formed near the end 12 of the arcuate cutter blade B for receiving a pivot pin P or other suitable means for securing the blade B to the mandrel M while allowing such blade B to be pivoted radially in a substantially horizontal plane relative to the mandrel M. As viewed in FIG. 3 of the drawings, the device of the present invention is arranged for cutting upon clockwise rotation of the mandrel M; therefore, the eye 11 and the pivot pin P are located near the end 12 which is normally the leading end of the blade B as it is being rotated by the mandrel M. However, it will be appreciated that the mandrel M may also be rotated in a counterclockwise direction as viewed in FIG. 3 for cutting, in which case the end 12 is the trailing end.

A torque bearing lug member or projection L normally extends longitudinally outwardly from the blade B for engaging one side of a radially extending slot or groove R in the mandrel M which is provided for driving the blade B as the mandrel M is rotated for thereby reducing or eliminating a shearing load on the pivot pin P.

As the mandrel M is normally rotated clockwise, a substantially plane surface 14, which is disposed on the trailing side of the drive block or projection L as the mandrel M is rotated clockwise, is provided for engaging the surface 7c of the slot R as the blade B is pivoted radially outwardly. A similar plane surface 14a is provided on the opposite side of the lug L for engaging the opposite side of the groove R when the mandrel is rotated counterclockwise. As is best seen by comparing FIGS. 2 and 3 of the drawings, while the blade B is pivoted laterally outwardly it also moves circumferentially counterclockwise relative to the mandrel M and to the pivot pin P. However, the leading edge 11a of the slot 11 preferably does not engage the pin P so as to reduce or eliminate shearing or torque load thereon.

The cutting blade B has an arcuate surface 15 on which the cutting elements or cutting particles 10 are secured or formed. The arcuate surface 15 is preferably inclined inwardly and upwardly from its lower edge 15a to its upper edge 15b throughout the length of the curved surface 15 from the leading end 15c to the trailing end 15d. Thus, a substantially V-shaped notch is cut into the pipe T throughout its circumference until the pipe T is cut completely through, as will be more evident hereinafter. As illustrated in the drawings (FIG. 4) the cutting particles 10 are arranged in diagonal spaced rows which extend diagonally from the lower edge 15a to the upper edge 15b and which are inclined from the leading end 15c toward the trailing end 15d to urge cuttings or bits and pieces of pipe which have been cut to move upwardly away from the lower edge 15a of the blade B and out of the path of the cutting elements 10 as the cutting operation advances. Such cutting elements 10 are preferably tungsten carbide particles which are embedded and bonded by any suitable bonding agent such as an epoxy resin to the arcuate surface 15. Such cutting particles 10 may be bonded to the arcuate surface 15 by using a welding flux heated by a torch or the like. The depth of the cut made by the cutting elements 10 may be predetermined by setting such elements so that they project a predetermined distance from the arcuate surface 15.

A spring 18 or other suitable resilient member is secured to the mandrel M by a screw 18a or other suitable securing means for engagement with an external surface 15e of each blade B for constantly urging each blade B to pivot radially inwardly relative to the mandrel M. Arcuate recesses 20 are provided at circumferentially spaced intervals in the mandrel M for receiving the arcuate blades B when such blades are pivoted into the retracted position (FIG. 2).

Preferably a tapered expander or wedge W, or other suitable actuator means, is provided for urging the blades B to pivot radially outwardly into engagement with the inner periphery of the pipe or casing T. As illustrated in FIG. 1 of the drawings, the cylindrical wedge W, which is generally conical, slidably engages the upper portion 7 of the mandrel M for pivoting the blades B. The wedge W has a tapered or inclined surface 40 which is inclined inwardly and upwardly for engaging the similarly inclined surface 19 of the blade B to pivot such blades laterally or radially outwardly as the blades B and the wedge W are moved longitudinally together.

Various devices may be used for positioning the cutter C of the present invention at the desired elevation in the pipe to be cut and for supporting such cutter C at such elevation during the cutting operation. For purposes of illustration the cutter C is shown connected by means of the hollow mandrel portion 9 to a standard slip mechanism S, although other suitable devices may be employed for positioning the cutter C at the desired elevation. The slip mechanism S illustrated in FIG. 1 of the drawings includes a hollow sleeve or body 41 which is slidably mounted on the tubular body 9 between the cutter mechanism C connected at the upper end of the tubular body 9 and a lower stop nut 50 positioned at the lower end of the tubular body 9. The stop nut 50 which is connected by threads 9a or other suitable means to the tubular body 9, has an inclined annular shoulder 50a which is inclined inwardly and upwardly for engaging a correspondingly inclined surface 41a at the lower end of the body 41 for supporting the slip mechanism S while it is being lowered into or lifting out of a well pipe.

The sleeve or body 41 has longitudinally extending wiper blocks or shoes 42 at circumferentially spaced intervals about the body 41 for frictionally engaging the inner periphery of the well pipe to hold the body 41 against axial rotation in the pipe or casing for a purpose which will be described more fully hereinafter. Such frictional engagement is maintained by resilient springs 42a which are provided for constantly urging the shoes 42 laterally outwardly relative to the sleeve or body 41.

The tubular body 9, which has an annular shoulder 9b formed thereon for a purpose which will be described more fully hereinafter, extends longitudinally upwardly through the opening 41b in the sleeve 41. The tubular body 9 is adapted to receive an externally threaded sleeve 43 which is positioned slightly above the nut 50 and is provided for engaging a segmented or expandable nut 51. The expandable nut 51 is carried in an annular groove or recess 41c in the sleeve or body 41, and each of the segmented portions of the nut 51 is urged radially inwardly by a spring or other suitable resilient member 52 to yieldably engage the threaded sleeve 43 for a purpose to be described more fully hereinafter.

The slip mechanism S comprises the standard slip members 60 which are slidably mounted in the sleeve or body 41 by means of a T-head 60a inserted into a T-slot 41d in the sleeve 41. Each of the slip members 60 has lateral ridges 60d extending circumferentially relative to the tubular body 9 for engaging the inner periphery of the pipe or tubing in which the slip mechanism S is inserted to secure the cutter C against longitudinal movement therein.

Each slip member 60 has a dovetail 61 formed on its inner surface 61a for engaging a corresponding dovetail 65a which is provided on the slip cone or bowl 65 for slidably connecting the slip members 60 to the slip cone 65 to prevent separation thereof as the slips 60 move radially inwardly and outwardly and longitudinally relative to the slip cone 65.

The wedge cone W which is provided for expanding the cutter blades B radially outwardly normally extends circumferentially around the upper portion 7 of the mandrel M and is slidably engaged therewith. The generally conical wedge W is preferably secured in the upper end 65b of the slip cone 65 by means of an annular split sleeve or split nut 67. The wedge cone W normally has an annular groove or channel 70 provided therein for receiving the split nut 67 which in turn is connected by means of threads 67a or other suitable means to the upper end 65b of the slip cone 65. The nut 67 has an upper annular shoulder 67b and a lower shoulder 67c for engaging corresponding shoulders 70b and 70c, respectively, in the wedge cone W for locking the wedge W to the slip bowl 65. The wedge cone W also normally has an annular groove 70a adjacent the groove or channel 70 and immediately thereabove for receiving an annular thrust washer 71. An annular ring or washer 74 is preferably provided at the bottom surface 70d formed at the lower end of the wedge cone W, and at the lower end 7b of the mandrel M for a purpose to be described hereinafter.

The slip bowl 65 also has an annular bore 65c which terminates at its lower end at an inside annular shoulder 65d. The coil spring or other suitable resilient member 72 is preferably provided in the annular bore 65c for performing several functions, one of which is to cushion the downward force or thrust of the blade B on the wedge block W. The upper end 72a of the spring 72 engages the ring or washer 74 while the lower end 72b of the spring 72 normally engages an annular ring or spring stop 75 which is positioned in the bore 65c and is supported on the annular shoulder 65d.

In operation, the cutter C, with the slip mechanism S and the other parts in the position shown in FIG. 1, is inserted into the casing or tubing T. The shoes 42 frictionally engage the inner periphery of the pipe T to restrain the sleeve 41 against axial rotation. When the cutter C has been positioned at the desired elevation for cutting the pipe T, the mandrel M is then rotated clockwise (as viewed in FIGS. 2 and 3) and simultaneously slowly lowered in the well pipe. With the sleeve 41 restrained against axial rotation by the shoes 42, the clockwise rotation of the mandrel M and the tubular body 9 attached thereto will screw the threads 43 out of the lower end of the segmented nut 51, disengaging the tubular body 9 and the rest of the mandrel M from the body 41.

The mandrel M is then to be lowered with or without rotation, which lowering is transmitted to the slip bowl 65 by the engagement of the shoulder 7b with the ring 42, which in turn engages the spring 72.

As the slip cone 65 moves longitudinally downwardly relative to the slips 60 it moves the slips radially outwardly causing the circumferentially extending ridges or teeth 60d to engage the inner periphery of the pipe.

Thereafter, downward movement of the mandrel M with the inclined surface 19 of the blade B engaging the inclined surface 40 of the wedge W, the wedge W causes the blades B to pivot radially or laterally outwardly relative to the mandrel M into engagement with the inner periphery of the pipe. Rotation of the mandrel M clockwise during the lowering thereof causes the blade B to move counterclockwise circumferentially relative to the mandrel M until the surface 14 of the lug L engages the surface of the mandrel M. When such contact occurs, the driving force or the torque of the mandrel M is imparted to the blades B through the lugs or projections L, thereby reducing or eliminating driving or shearing load on the pivot pins P.

The cutter members B are shown as having their pins P spaced from the leading edge 11a of their slots or eyes 11 when such blades B are in the expanded position (FIG. 3) with the load of cutting normally borne by the lugs or projections L, however, the torque or cutting load may be partially or equally distributed to the pins P, as desired.

As the blades B are pivoted laterally outwardly, the lower edge 15a of the arcuate surface 15 initially engages the inner periphery of the pipe. As the cutting continues, the cut deepens and gradually assumes the angle of inclination of the arcuate surface 15 so that all of the cutting elements 10 are then cutting into the pipe T, thereby forming a substantially horizontally disposed V-shaped notch at the point of the cut.

Throughout the cutting operations, a circulating fluid such as drilling fluid, water, or air, is normally circulated through the opening 8 in the hollow mandrel M and then upwardly in the annular space between the cutter C and the tubing T to cool the cutter C, and particularly the cutting elements 10. Also, the cuttings are washed upwardly in the diagonal spaces or channels 10a between the rows of cutting elements 10 by such drilling fluid. The cutting particles 10 effect a grinding action due to their diagonal disposition which has been found to be more efficient than the usual chipping or milling action.

Upon completion of the cut, which is indicated to the operator at the surface by a slight increase in the rotational speed of the work string, rotation is stopped, and the work string on which the cutter C is suspended is raised slowly to retract the blades B and to disengage the slip mechanism S from the pipe or casing T.

As the mandrel M and the blades B, the tubular body 9 and the bottom nut 50 connected thereto, are initially raised, they will move longitudinally upwardly relative to the slip mechanism S since it is held against longitudinal movement by the frictional engagement of the shoes 42 and the slip members 60 with the inner periphery of the pipe. At first, such slip members 60 will continue to be held in the expanded position by the slip cone 65 as it continues to be urged longitudinally downwardly by the compressed spring 72 during the initial raising of the mandrel M. However, as the mandrel M and the tubular body 9 therewith continue to rise, the annular shoulder 9b on the tubular body 9 engages the annular disc 75 which then urges the spring 72 longitudinally upwardly. The upper end 72a of the spring 72 engages the ring 74 which engages only the lower end 7b of the mandrel M until the ring 74 has moved longitudinally upwardly a sufficient distance to also engage the lower end 70d of the wedge cone W, at which time the spring 72 exerts an upward lifting action on the wedge W and the slip bowl 65. By the time the ring 74 has been lifted to engage the lower end 70d of the wedge cone W, the spring 18 has forced the blades B to the retracted position (FIG. 2).

Continued movement longitudinally upwardly of the mandrel M and the tubular body 9 after the spring 72 has caused the ring 74 to engage the lower end or bottom 70d of the wedge cone W, causes the shoulder 70c to engage the annular shoulder 67c of the split ring 67 to thereby lift the slip bowl 65 longitudinally along with the mandrel M.

As the slip bowl 65 is raised, it moves longitudinally upwardly relative to the slip members 60 which are still held against longitudinal movement thereby releasing the slip bowl 65 from the slips 60, so that the slips can then slide inwardly and release from the pipe T.

As the mandrel M is raised relative to the sleeve or body 41, the threaded sleeve 43 carried near the lower end of the tubular body 9 engages the expandable or segmented nut 51 carried in the body 41, thereby expanding the nut 51 to force the sleeve 43 to be drawn longitudinally upwardly in the nut 51 until the inclined annular surface 50a of the nut 50 engages the inclined annular surface 41a of the body 41 (FIG. 1). The cutter C is thus returned to its retracted or running-in position of FIG. 1 and it may be moved either longitudinally upwardly or downwardly in the well pipe for repositioning and additional cutting or for removal from the well pipe.

Although the cutter C is illustrated for purposes of description as being operated mechanically by the wedges W, it can be appreciated that the blades B may be pivoted radially outwardly and inwardly by hydraulic or other mechanical means. Also, the cutter C may be used horizontally or in another non-vertical position in a pipe or tubing or the like, whether situated in a well bore or not.

It should also be noted that the cutter C may be arranged for cutting upon counterclockwise rotation by putting left-hand threads on the sleeve 43 and the nut 51 and by reversing the positions of the blades B, the pivot pin P and the lugs L relative to the mandrel M.

In FIG. 5 of the drawings, a modified version of the apparatus of the present invention is illustrated in which some of the parts are the same as those in the embodiment illustrated in FIG. 1 and in which some of the parts are different. Such identical parts are identified by the same numeral designations and the new or modified parts are identified by new or different numeral designations.

In the construction illustrated in FIG. 5 the cutter blades B-1 are similar to the blades B shown in FIG. 1, except for certain differences which will be discussed. The wedge members W-1, which are provided for urging the blades B-1 to pivot radially outwardly, are positioned above such blades B-1 rather than below as in FIG. 1. Also, with the FIG. 5 construction, the blades B-1 are mounted in an annular blade housing H which is rotated by a modified mandrel M-1.

Such cutter blades B-1 are pivotally mounted by means of pivot pins P in arcuate recesses 120 which are provided at circumferentially spaced intervals in the blade housing H. Such pivot pins P are preferably secured in the blade housing H so as to extend longitudinally through an elongate slot or hole 111 formed in each blade B-1. The slot or hole 111 is substantially identical to the slot or hole 11 formed in the blades B and functions in substantially the same manner.

With each modified blade B-1, a lug or projection L-1 is disposed below the blade so as to extend into a slot or groove R-1 in the housing H. Other than being positioned below the blade B-1 rather than above the blade, as is the lug L, the lug L-1 functions in the same manner as the lug L in driving each blade B-1.

Also, the blade B-1 differs from the blade B in that the blade B-1 normally has cutting particles 110' on the lower surface 113 and as well as cutting particles 110 on the outer arcuate surface 115 of the blade B-1. Such cutting particles 110 and 110' are embedded and bonded in the surfaces 113 and 115, respectively, or as secured thereto by other suitable securing means.

The blades B-1 are further distinguished from the blades B in that each of the blades B-1 has an upper inclined surface 119 which is provided for engagement by one of the wedge blocks or expanders W-1 positioned thereabove on the mandrel M-1. In the modified form of the present invention as illustrated in FIG. 5, one inclined wedge block or expander W-1 engages each of the blades B-1 mounted therebelow in the blade housing H. Also, the wedge blocks W-1 are preferably formed integrally with the mandrel M-1 or they may be secured thereto by suitable securing means as desired.

Each of the wedge blocks W-1 has an inclined surface 140 which is inclined inwardly and downwardly for engaging a similarly inclined surface 119 of the blade B-1 adjacent thereto. Each wedge block W-1 engages the surface 119 of a blade B-1 to pivot the blade B-1 radially outwardly into cutting engagement with the casing or tubing or the like when the mandrel M-1 is moved longitudinally downwardly relative to the blades B-1.

The blade housing H is preferably rotatably mounted in the upper end 65b of the slip cone 65 and is secured in such position by means of an annular split sleeve or split nut 67. The blade housing H has an annular groove 170 formed therein which is substantially identical to an annular groove 70 of the wedge cone W. The annular groove 170 of the blade housing H has shoulders 170b and 170c which are opposed to the adjacent shoulders 67b and 67c, respectively, of the split nut 67. Such shoulders 170b and 170c and the shoulders 67b and 67c opposed thereto, respectively are provided for securing the blade housing H to the slip cone 65 to prevent longitudinal movement when the slips 60 are anchored in the pipe T. A split bushing or washer 171 corresponding to the washer 71 of FIG. 1 is positioned above the split nut 67 for contact by the housing H during rotation thereof.

The blade housing H is secured to the lower portion of the mandrel M-1 for rotation therewith by any suitable means such as longitudinally extending splines 180 formed on the inner surface of the annular housing H which are adapted to extend radially into corresponding longitudinal slots or grooves 181 formed on the adjacent portion of the mandrel M-1. Thus, the blade housing H and the blades B-1 mounted thereon may be rotated by rotation of the mandrel M-1.

As shown in FIG. 5, such grooves 181 preferably extend longitudinally above and below the splines 180 on the housing H to allow the housing H and the mandrel M to move longitudinally relative to each other during rotation.

The lower portion of the hollow mandrel M-1 which extends longitudinally through the housing H may be connected by threads or other suitable connecting means to the tubular body 9. The tubular body 9 of FIG. 5 is identical to that shown in FIG. 1, and it preferably connects the mandrel M-1 to the slip mechanism S and other structure shown in FIG. 1.

As shown in FIG. 5, an annular ring or collar 174 is provided for engaging the upper end 72a of the spring 72 which functions in the same manner as in the embodiment illustrated in FIG. 1. The annular sleeve or ring 174, which enables the spring 72 to move the mandrel M-1, is secured to the lower portion 107b of the mandrel M-1 by means of one or more lock screws 174a or other suitable fastening means.

FIG. 6 illustrates an isometric view of the blade B-1 shown in FIG. 5. As particularly illustrated in FIG. 6, the blade B-1 has cutting elements or cutting particles 110 arranged in diagonally spaced rows on the surface 115 in essentially the same arrangement as the cutting particles 10 on the blades B. Such diagonal rows are inclined from the leading end 115c toward the trailing end 115d of the blade B-1. The arrangement of the cutting particles 110 on the blades B-1 illustrated in FIG. 6 urges the cuttings away from the path of the blades B-1 as they are rotated clockwise by the mandrel M-1.

Cutting particles 110' are also provided on the cutting lower surface 113 of each blade B-1 to cut an annular horizontal portion of the pipe or casing T while the particles 110 are cutting an annular inclined portion thereof. Such cutting particles 110' are arranged in diagonally spaced rows and are secured on the lower surface 113 by bonding or other suitable means. Such rows extend diagonally across the surface 113 from the outer edge 115a to the inner edge 113a thereof. The diagonal rows are inclined from the leading end 115c toward the trailing end 115d of each blade B-1, and as best seen in FIG. 6, the inclined rows are disposed at a substantially opposite angle from the rows of cutting particles 110 on the surface 115 to urge the cuttings away from the path of the blades B-1 as the blades are rotated clockwise by the mandrel M-1.

The apparatus shown in FIG. 5 is operated in basically the same manner as the cutter C shown in FIG. 1. Such apparatus is positioned at the desired elevation by a setting of the slip mechanism S as explained in connection with FIG. 1. Then, the mandrel M-1 is rotated to impart rotation to the cutter blades B-1. Such rotation of the mandrel M-1 is transmitted to the blades B-1 due to the connection of the mandrel M-1 to the housing H through the cooperating splines 180 and 181. Also, the rotation of the housing H is transmitted to the cutter blades B-1 by the engagement of the lugs L-1 with the walls of the grooves R-1 in the same manner as described in connection with FIG. 1. As the mandrel M-1 is rotated, it is also moved downwardly to move the inclined surface 140 on each of the wedge blocks W-1 downwardly for moving the blades B-1 outwardly for cutting action.

Also, as the mandrel M-1 is moved longitudinally downwardly, the ring 174 on the lower end of the mandrel M-1 compresses the spring 72 which functions as a resilient cushion to cushion the impact of the wedge blocks W-1 on the blades B-1. Because of the splined connection or union between the mandrel M-1 and the housing H, the mandrel M-1, the blades B-1, and the housing H are rotated substantially as a unit with little or no rotational movement between the wedge blocks W-1 and their respective blades B-1. Thus, each wedge W-1 is in constant engagement with its corresponding blade B-1 to urge such blade B-1 radially outwardly and to furnish back-up support to the blade B-1 during the cutting operation.

Each blade B-1 of the FIG. 5 modification is supported during its radial expansion or pivotal movement relative to the blade housing H by means of the lug or tab L-1. The lug L-1 is disposed below the blade B-1 and is adapted to engage the substantially vertical wall of the radial groove R-1 in the blade housing H to impart the driving force of the blade housing H to the blade B-1 and thereby substantially eliminate the driving or shearing load on the pivot pins P during the cutting operation as explained in connection with the lugs L of FIG. 1.

As the blades B-1 are urged radially outwardly, the downward force on the mandrel M-1 and the cutting particles 110 on the surface 115 as well as the cutting particles 110' on the lower surface 113 of the blade B-1 cut an annular groove in the pipe or tubing T to sever same.

After the cutting operation has been completed, the mandrel M-1 is raised longitudinally, as explained heretofore in connection with FIG. 1, to release the slip mechanisms. When the mandrel M-1 has moved longitudinally upwardly to the position shown in FIG. 5, the annular ring or shoulder 174 engages the lower surface of the blade housing H so that further longitudinally upward movement of the mandrel M-1 will raise the apparatus in the pipe or tubing T.

Still another alternate blade construction is illustrated in FIG. 7 which is especially adapted for use with the FIG. 5 version of the present invention but which may be used with the FIG. 1 form also as will be explained. The blade B-2 which is shown in FIG. 7 is substantially identical to the blade B-1 except that the blade B-2 has a pair of inclined surfaces 215a and 215b which are disposed at opposite angles from the leading edge 215. Such inclined surfaces 215a and 215b have two sets of cutting elements or particles 210 thereon to provide for angular cutting of the pipe with both sets of the cutting particles 210. The cutting elements or particles 210 are aligned in diagonally spaced rows which extend diagonally from the leading edge 215 to the lower and upper surfaces 213 and 213a, respectively. Such rows are also inclined from the leading end 215c toward the trailing end 215d of the blade B-2 as it is rotated clockwise in the apparatus of this invention illustrated in FIG. 5 to urge the cuttings away from the path of such blades B-2.

The blades B-2 can be adapted for use with the FIG. 1 construction by reversing the position of the projections or lugs L-2 and securing such lugs or tabs L-2 on the upper side of the blades B in like manner as the lugs L.

The foregoing disclosure and description of the invention is illustrative and explanatory thereof, and various changes in the size, shape, and materials as well as in the details of the illustrated construction may be made within the scope of the appended claims without departing from the spirit of the invention.

What is claimed is:
1. A cutter member adapted to be used in an inside pipe cutter having a mandrel, cutter members carried on said mandrel and extending partially circumferentially thereof and disposed for movement in a plane substantially perpendicular to the axis of said mandrel, pivot means extending substantially parallel to the axis of the mandrel for pivotally connecting said cutter members to said mandrel, expander means for pivoting said cutter members laterally outwardly relative to said mandrel into engagement with the inner periphery of the pipe for cutting the pipe upon axial rotation of said mandrel, and means for positioning said cutter members at the desired elevation in the pipe, comprising:
(a) an elongate body having an arcuate convex external surface and having a pivot opening at one end thereof,
(b) said body having longitudinally extending upper and lower edges on said convex surface,
(c) a plurality of cutter elements secured in a plurality of diagonally spaced rows on said arcuate convex surface,
(d) said rows extending between said upper and lower edges and at an angle relative to the longitudinal axis of said body,
(e) said cutter elements projecting laterally outwardly from said arcuate convex surface for cutting engagement with the inside of a pipe, and
(f) said cutter elements in each row being disposed substantially adjacent to each other to define channels between each row for the flow of drilling mud or cuttings cut by the cutter elements.

2. The structure of claim 1 wherein the arcuate convex external surface between the upper and lower edges is inclined laterally inwardly.

3. The structure of claim 1, including:
(a) said pivot opening being elongated to form a longitudinal slot for receiving said pivot means to thereby allow pivotal movement and limited longitudinal movement of each of said cutter members relative to said mandrel, and
(b) lug means on each of said cutter members for engaging said mandrel upon rotation of said mandrel relative to said cutter members for receiving at least a portion of the torque load to relieve the torque load on said pivot means.

References Cited by the Examiner
UNITED STATES PATENTS

| | | | |
|---|---|---|---|
| 1,068,991 | 7/1913 | Dunkerley et al. | 30—104 |
| 1,413,522 | 4/1922 | Denning | 166—55.3 |
| 1,454,819 | 5/1923 | Jones et al. | 166—55.6 |
| 1,677,507 | 7/1928 | Vock et al. | 166—55.7 |
| 1,755,206 | 4/1930 | Church | 166—55.8 |
| 2,180,693 | 11/1939 | Reed | 166—55.3 |
| 2,208,011 | 7/1940 | Anderson | 29—27 |
| 2,215,638 | 9/1940 | Ellis | 166—55.8 |
| 2,304,793 | 12/1942 | Bodine | 166—55.8 X |
| 2,322,695 | 6/1943 | Kinzbach | 166—55.8 |
| 2,638,667 | 5/1953 | Anderson | 30—107 |
| 2,640,537 | 6/1953 | Edwards | 166—55.8 |
| 2,922,627 | 1/1960 | Kammerer | 166—55.8 |
| 2,940,522 | 6/1960 | Taylor et al. | 166—55.8 X |
| 2,999,541 | 9/1961 | Kinzbach et al. | 166—55.7 |

WILLIAM FELDMAN, *Primary Examiner.*

MYRON C. KRUSE, *Examiner.*